US009148725B2

(12) United States Patent
Gupta et al.

(10) Patent No.: US 9,148,725 B2

(45) Date of Patent: Sep. 29, 2015

(54) METHODS AND APPARATUS FOR IMPROVING AUDIO QUALITY USING AN ACOUSTIC LEAK COMPENSATION SYSTEM IN A MOBILE DEVICE

(71) Applicant: BlackBerry Limited, Waterloo (CA)

(72) Inventors: Malay Gupta, Rolling Meadows, IL (US); Adam Sean Love, Waterloo (CA); Brady Nicholas Laska, Ottawa (CA); Chris Forrester, Waterloo (CA); Sean Bartholomew Simmons, Waterloo (CA)

(73) Assignee: BlackBerry Limited, Waterloo (CA)

( * ) Notice: Subject to any disclaimer, the term of this patent is extended or adjusted under 35 U.S.C. 154(b) by 340 days.

(21) Appl. No.: 13/770,477

(22) Filed: Feb. 19, 2013

(65) Prior Publication Data

US 2014/0235173 A1 Aug. 21, 2014

(51) Int. Cl.

| | |
|---|---|
| ***H04B 1/38*** | (2015.01) |
| ***H04R 3/04*** | (2006.01) |
| *H04R 3/00* | (2006.01) |
| *H04R 29/00* | (2006.01) |

(52) U.S. Cl.

CPC *H04R 3/04* (2013.01); *H04R 3/005* (2013.01); *H04R 29/00* (2013.01); *H04R 2460/15* (2013.01); *H04R 2499/11* (2013.01)

(58) Field of Classification Search

CPC . H04R 29/00; H04R 2460/15; H04R 2499/11

USPC .......... 455/73, 130, 135, 226.3, 306, 307, 62; 381/99, 374, 375, 377, 379

See application file for complete search history.

(56) References Cited

U.S. PATENT DOCUMENTS

| | | | | |
|---|---|---|---|---|
| 2001/0014161 | A1 | 8/2001 | Baiker et al. | |
| 2010/0106272 | A1 * | 4/2010 | Sato | 700/94 |
| 2011/0142247 | A1 | 6/2011 | Fellers et al. | |
| 2011/0150209 | A1 * | 6/2011 | Riedl et al. | 379/388.02 |
| 2011/0150257 | A1 | 6/2011 | Elmedyb et al. | |
| 2012/0207315 | A1 * | 8/2012 | Kimura et al. | 381/66 |

FOREIGN PATENT DOCUMENTS

WO 2010112073 A1 10/2010

OTHER PUBLICATIONS

Extended EP Search Report for EP Application No. 13155703.5, dated Jun. 25, 2013, 5 pages.

* cited by examiner

*Primary Examiner* — Tuan Pham

(74) *Attorney, Agent, or Firm* — Ridout & Maybee LLP

(57) ABSTRACT

Techniques for use in improving audio quality with use of an acoustic leak compensation (ALC) system in a mobile device are described. The mobile device includes a receiver and a microphone which is acoustically coupled to the receiver. A change in a signal power of signals received at the microphone is detected. In response to the detecting, a probe signal is enabled, and a frequency response between the receiver and the microphone is estimated using the probe signal as an input. Filter coefficients of a filter are calculated based on the estimated frequency response, and the calculated filter coefficients are applied to the filter. The filter type may be selected from a plurality of filter types based on an estimated signal-to-noise ratio (SNR) of the microphone signal.

18 Claims, 8 Drawing Sheets

METHODS AND APPARATUS FOR IMPROVING AUDIO QUALITY USING AN ACOUSTIC LEAK COMPENSATION SYSTEM IN A MOBILE DEVICE

BACKGROUND

1. Field of the Technology

The present disclosure relates generally to mobile communication devices which operate in wireless communication networks for voice call communications.

2. Description of the Related Art

A mobile device, such as a cellular telephone or smartphone, may operate in a wireless network for making and receiving voice calls. Many mobile devices may be handheld, that is, sized and shaped to be held or carried in a user's hand and used while held or carried. Some mobile devices, when handling voice calls (any type of voice communication, including but not limited to telephone calls, push-to-talk communications and voice over Internet-based voice communications) may include a receiver that may be held by a user proximate to the user's ear. Although a receiver may be an integral or built-in component in the mobile device or wired or wireless accessory such as an earpiece or headset, for example, technical considerations may apply especially to a receiver that is built-in to a mobile device and that is held proximate to a user's ear. The quality and intelligibility of downlink audio during voice calls is dependent upon the frequency response between a receiver of the mobile device and the user's ear.

Note, however, that the frequency response is a variable function that depends on the user's ear, the way that the user positions the mobile device, and how tightly the user holds the receiver against their ear. When the user maintains a tight seal between the receiver and their ear, there may be an undesirable change in the intelligibility of the downlink speech, which is sometimes described as "muddy" (e.g. having more bass than necessary). This is characteristic of situations where there is a lot of background noise and the user presses the device firmly against his/her ear.

It would be advantageous to improve the quality and intelligibility of downlink audio for the mobile device with a technique that promotes equalization of the frequency response between the receiver and the user's ear.

BRIEF DESCRIPTION OF THE DRAWINGS

Embodiments of present disclosure will now be described by way of example with reference to attached figures, wherein:

FIG. 5(*b*) is a graph of a frequency response of the receiver-to-ear channel between the receiver and the ALC microphone associated with a loose acoustic coupling for two different humans;

FIG. 6(*b*) is a graph of frequency responses of the receiver-to-ear channel between the receiver and the ALC microphone associated with both tight and loose acoustic couplings, using a head and torso simulator (HATS);

DETAILED DESCRIPTION OF THE PREFERRED EMBODIMENTS

Figure 1:
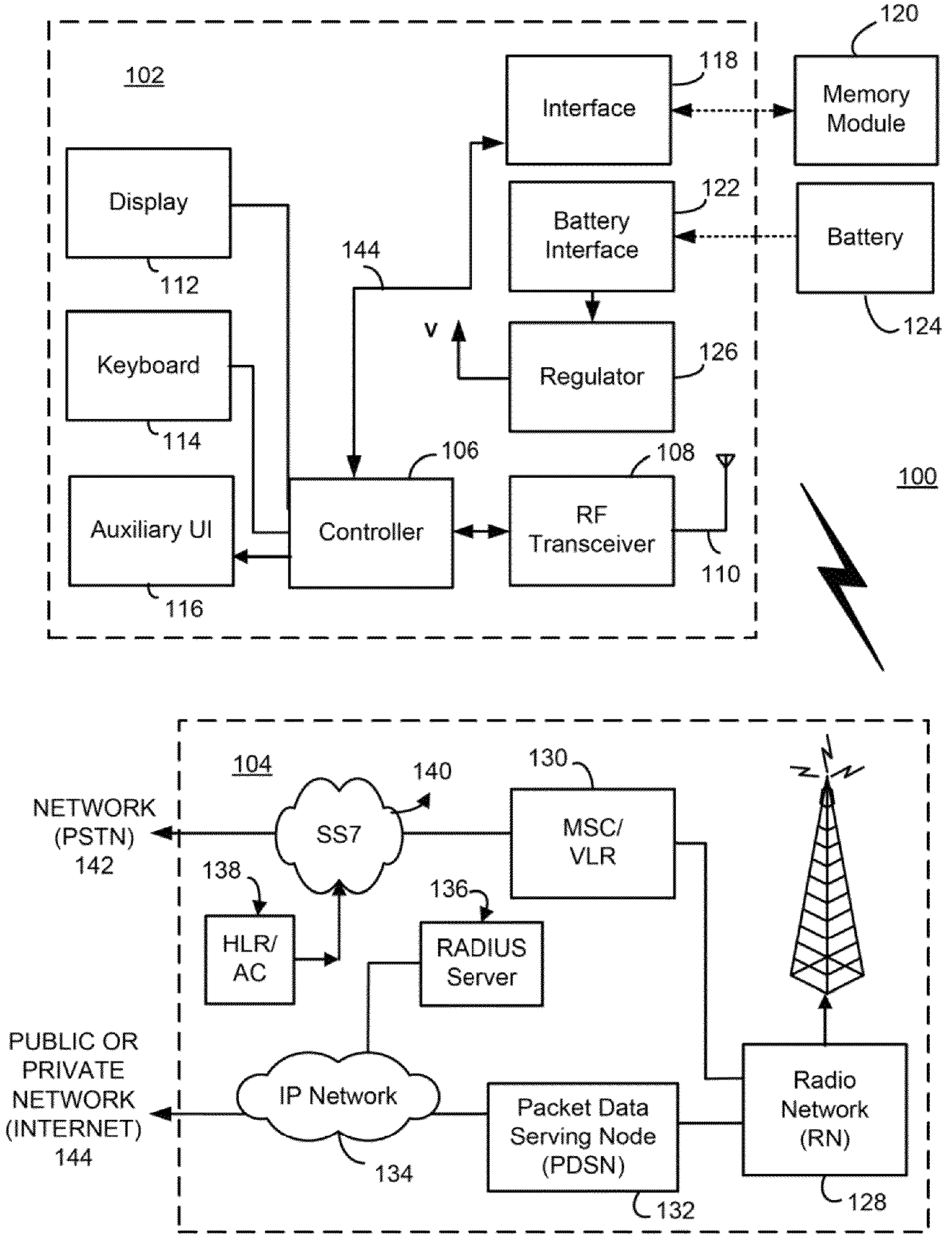
FIG. 1 is a block diagram which illustrates pertinent components of a mobile communication device which operates in a wireless communication network for making and receiving voice calls.

Techniques for use in improving audio quality with use of an acoustic leak compensation (ALC) system in a mobile device are described. The mobile device includes a receiver and a microphone which is acoustically coupled to the receiver. This microphone may be referred to as an acoustic leak compensation (ALC) microphone. In this context, acoustic coupling refers to the cooperation between the receiver and the microphone in transmitting and receiving sounds; colloquially speaking, a sound emitted by the receiver is picked up by the microphone. The receiver and microphone may be physically coupled to one another (for example, they may be part of a single-piece mobile device) and they may be electrically coupled (for example, they may receive power from a common power source); acoustic coupling is not necessarily dependent upon physical or electrical coupling, however. A change in a signal power of signals received at the microphone is detected. This change is based on (or is a function of) a change in an acoustic seal coupling between the receiver and the microphone. Generally speaking, a change in an acoustic seal coupling can occur as the seal between the user's ear and the receiver changes, and the acoustic coupling between the receiver and the microphone changes as result. In response to the detecting, a probe signal is enabled, and a frequency response between the receiver and the microphone is estimated using the probe signal as an input. In other words, a known probe signal is input, and the output is observed, and from this the frequency response is estimated or approximated. Filter coefficients of a filter are calculated based on the estimated frequency response, and the calculated filter coefficients are applied to the filter. The filter type may be selected from a plurality of filter types based on an estimated signal-to-noise ratio (SNR) of the microphone signal.

Correspondingly, a mobile communication device of the present disclosure may include a receiver, a microphone which is acoustically coupled to the receiver, a filter, a probe signal generator, a detector, a frequency response estimator, and a filter coefficients calculator. The filter has an input which receives a baseband signal, and an output coupled to an Input to the receiver. The detector is configured to detect a change in a signal power of signals received at the microphone. In general, an element that is configured to perform a function is suitable for performing the function, or is adapted to perform the function, or Is operable to perform the function, or is otherwise capable of performing the function.) This change is based on a change in an acoustic seal coupling between the receiver and the microphone. A switch is utilized to enable, in response to the detector, a probe signal from the probe signal generator for outputting to the filter. Enabling the probe signal typically involves activating the probe signal generator so that the probe signal generator may output a probe signal, or in other words, inject a probe signal into an input of the filter. The frequency response estimator is configured to estimate a frequency response between the receiver and the microphone using the probe signal as an input, and the filter coefficients calculator is configured to calculate filter coefficients of the filter based on the estimated frequency response and to apply the calculated filter coefficients to the filter.

This system may further include a signal-to-noise ratio (SNR) estimator having an input coupled to an output from the microphone, where the SNR estimator is configured to estimate an SNR of the microphone signal and a switch or selector configured to select one of a plurality of filters responsive to the SNR estimator. The detector may include a first signal power estimator configured to detect a first signal power of a filtered baseband signal from the output of the filter a second signal power estimator configured to detect a second signal power of a microphone signal from the output of the microphone; a signal power ratio generator configured to produce a signal power ratio of the first and the second signal powers; and a threshold detector configured to signal the switching circuitry responsive to the signal power ratio generator, when the ratio is detected to be outside a threshold. Finally, a voice inactivity detector which is configured to detect voice inactivity in the baseband signal may be utilized. Here, the switch is further configured to enable the probe signal from the probe signal generator for outputting to the filter in response to both the detector and the voice inactivity detector.

To illustrate one type of environment of the present disclosure, FIG. 1 is a block diagram of a communication system 100 which includes a mobile communication device 102 configured to communicate in a wireless communication network 104. Mobile device 102 may include a visual display 112 (which may include a conventional display or a touch display), a keyboard 114, and perhaps one or more auxiliary user interfaces (UI) 116, each of which is coupled to a controller 106. Controller 106 is also coupled to radio frequency (RF) transceiver 108 and an antenna 110.

Typically, controller 106 is embodied as a central processing unit (CPU), which runs operating system software in a memory component (not shown). Controller 106 will normally control overall operation of mobile device 102, whereas signal-processing operations associated with communication functions are typically performed in RF transceiver 108. Controller 106 interfaces with device display 112 to display received information, stored information, user inputs, and the like.

Keyboard 114, which may be (for example) a telephone-type keypad or full alphanumeric keyboard or a virtual keyboard presented on a touch screen surface, is normally provided for entering data for storage in mobile device 102, information for transmission to network 104, a telephone number to place a telephone call, commands to be executed on mobile device 102, and possibly other or different user inputs.

Mobile device 102 operates RF transceiver 108 for communications with wireless network 104 over a wireless link via antenna 110. RF transceiver 108 performs functions like those of a radio network (RN) 128, including for example modulation/demodulation, encoding/decoding, and/or encryption/decryption.

Mobile device 102 may be powered in any fashion. For purposes of illustration, mobile device 102 will be described as being powered by one or more rechargeable batteries. Mobile device 102 includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126, which regulates power to the device, providing an output having a regulated voltage V. Mobile device 102 may also operate with use of a memory module 120, such as a Subscriber Identity Module (SIM) or a Removable User Identity Module (R-UIM), which is connected to or inserted in mobile device 102 at an interface 118.

Mobile device 102 may consist of a single unit, such as a data communication device, a cellular telephone, a multiple-function communication device with data and voice communication capabilities, a personal digital assistant (PDA) enabled for wireless communication, a handheld transceiver or a computer incorporating an internal modem. Alternatively, mobile device 102 may be a multiple-module unit comprising a plurality of separate components, including but in no way limited to a computer or other device connected to a wireless modem. Also for example, in the mobile device block diagram of FIG. 1, RF transceiver 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

In one embodiment of FIG. 1, mobile device 102 communicates with wireless network 104 which is a Third Generation (3G) network utilizing Code Division Multiple Access (CDMA) technologies. For example, wireless network 104 may be a cdma2000™ network having network components coupled as shown in FIG. 1. Cdma2000™ is a trademark of the Telecommunications Industry Association (TIA). As shown, wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile device 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile devices within its cell. The base station transceiver system normally performs such functions as modulation and possibly encoding and/or encryption of signals to be transmitted to the mobile device in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as the mobile device's current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile devices that are currently in its area of responsibility. This includes parts of the permanent mobile device data that have been transmitted from HLR/AC 138 to the VLR for faster access. However, the VLR of MSC 130 may also assign and store local data, such as temporary identifications. HLR/AC 138 also authenticates mobile device 102 on system access.

For packet data services of mobile device 102, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Although the system described above relates to cdma2000-based network and technologies, other suitable networks and technologies may be utilized, such as GSM/GPRS based technologies, Long Term Evolution (LTE) based technologies, and IEEE 802.11 based technologies (e.g. WLAN or WiFi operation).

Figure 2:
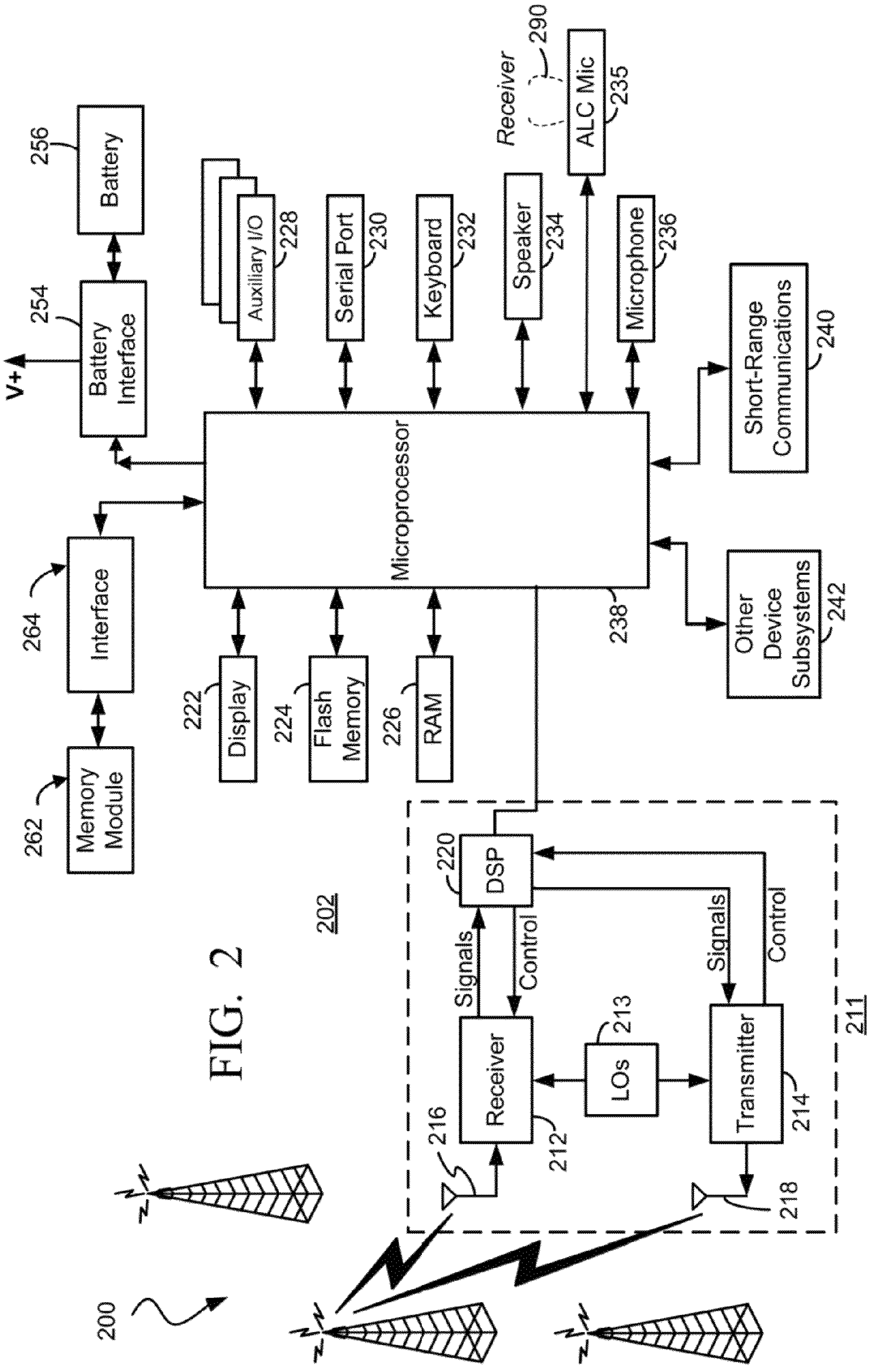
FIG. 2 is a more detailed diagram of an example mobile device of FIG. 1.

FIG. 2 is a block diagram of a more detailed example of a mobile device 202 which may employ the system of the present disclosure. Mobile device 202 may be a two-way communication device having at least voice calling capabilities and advanced data communication capabilities. Depending on the functionality provided by mobile device 202, it may be referred to as a data messaging device, a two-way pager, a cellular telephone with data messaging capabilities, a wireless Internet appliance, or a data communication device. Mobile device 202 may communicate with any one of a plurality of base station transceiver systems 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 may require a memory module 262, such as a Subscriber Identity Module or "SIM" card or a Removable User Identity Module (R-UIM), to be inserted in or connected to an interface 264 of mobile device 202 in order to operate in the network. Since mobile device 202 is a mobile battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown) which regulates power to all of the circuitry, providing an output having a regulated voltage V.

Microprocessor 238, which is one implementation of controller 106 of FIG. 1, controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on mobile device 202. A set of applications, which control basic device operations, including at least data and voice communication applications, will normally be installed on mobile device 202 during its manufacture. An illustrative application that may be loaded onto mobile device 202 may be a personal Information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

In a data communication mode, a received signal such as a text message, an e-mail message, or web page download will be processed by communication subsystem 211 and input to microprocessor 238. Microprocessor 238 will further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 may be a complete alphanumeric keyboard and/or telephone-type keypad and/or a virtual keyboard. These composed items may be transmitted over a communication network through communication subsystem 211.

In a voice communication mode (e.g. voice telephone call), the overall operation of mobile device 202 is substantially similar, except that the received signals would be output to speaker 234 and signals for transmission would be generated by microphone 236 (which is typically distinguished from ALC microphone 235, described below). Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component, which provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Speaker 234, which is part of the receiver (in general, the receiver may include speaker 234 and any other structure that functions for support or sound quality), is used in combination with an acoustic leak compensation (ALC) microphone 235 for the ALC techniques of the present disclosure, which are described in further detail in relation to FIGS. 4-10. The receiver has an acoustic coupling 290 with ALC microphone 235. Especially when a receiver is built-in with a mobile device, considerations such as size, shape, weight and convenience of the mobile device as a whole may affect the construction and geometry and of the receiver and whether the receiver may include features that may custom-fit or form a seal with users' ears.

As described, the mobile device may be operated in a wireless network for making and receiving voice telephone calls. The quality and intelligibility of downlink audio during voice calls is dependent on, amongst other things, the frequency response between the receiver of the mobile device and the user's ear. Note, however, that this frequency response is a variable function which depends on the user's ear, the way that the user positions the mobile device, and how tightly the user holds the receiver against their ear. When the user maintains a tight seal between the receiver and their ear, for example, there may be an undesirable change in the intelligibility of the downlink speech, which is sometimes described as "muddy" (having a lot of bass). This is characteristic of situations where there is a lot of background noise, and the user presses the device firmly against their ear.

Figure 3:
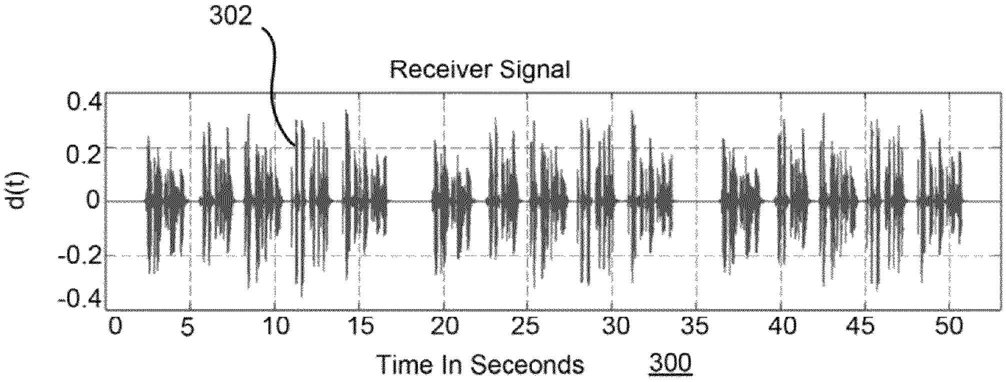
FIG. 3 is an example of a baseband signal of a receiver of the mobile device.
Figure 4:
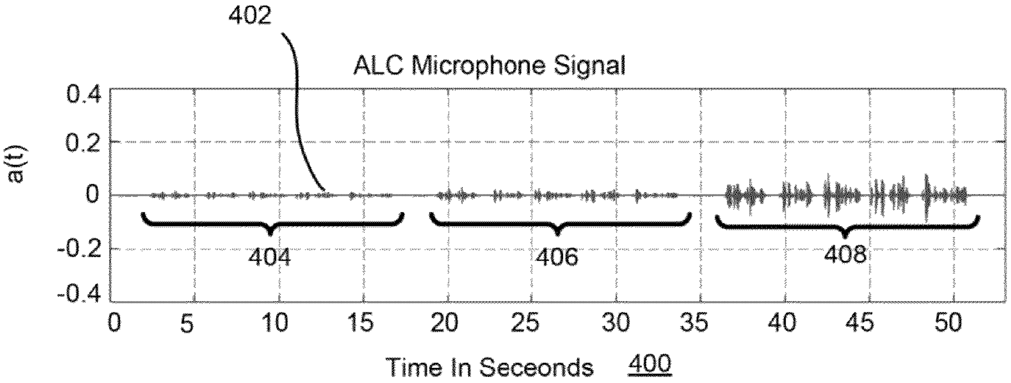
FIG. 4 is an example of a microphone signal of a microphone (i.e. an acoustic leak compensation or "ALC" microphone) which is acoustically coupled to the receiver.

Analysis has been performed in relation to this phenomena to devise techniques for reducing or eliminating its negative effects. To better illustrate the phenomenon in the time domain, FIG. 3 is a graph 300 which shows a baseband signal 302 from the receiver, and FIG. 4 is a graph 400 of a corresponding microphone signal 402 of an acoustic leak compensation (ALC) microphone which is acoustically coupled to the receiver. See e.g. speaker 234 and ALC microphone 235 of FIG. 2. The ALC microphone 235 is strategically positioned near or adjacent the receiver for the purpose of improving audio quality. The degree of nearness or adjacency may depend upon the construction of the mobile device (e.g., the mobile device's geometry and materials) and is not a matter of precise measurement. The user's ear provides the acoustic seal coupling which, when varied, varies the microphone signal 402 from the ALC microphone.

It has been observed that the signal power of the microphone signal increases in response to a tight acoustic coupling.

In the example of FIGS. 3-4, a signal segment 404 (timeframe of 1.5 seconds to 17.5 seconds) of the microphone signal 402 corresponds to a loose acoustic seal coupling; a signal segment 406 (timeframe of 18.5 seconds to 34.5 seconds) of the microphone signal 402 corresponds to a normal acoustic seal coupling; and a signal segment 408 (timeframe of 35.5 seconds to 51.5 seconds) of the microphone signal 402 corresponds to a tight acoustic seal coupling. Note the increase in the microphone signal 304 for the tight acoustic seal coupling (i.e. signal segment 408) as compared to the other couplings (i.e. signal segments 404 and 406). In this example, when the coupling is tight, the average root-mean-square (RMS) power of microphone signal 304 is about 9 dB above that of the regular coupling, and about 13 dB above that of the loose coupling.

Figure 5A:
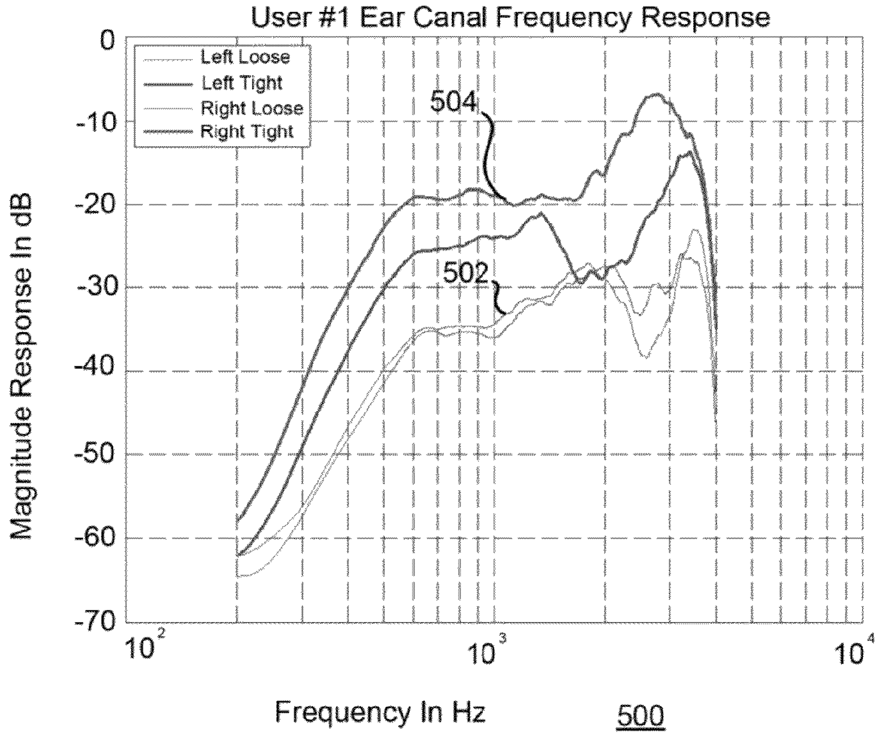
FIG. 5(*a*) is a graph of a frequency response of the receiver-to-ear channel between the receiver and the ALC microphone associated with a tight acoustic coupling for two different humans.
Figure 5B:
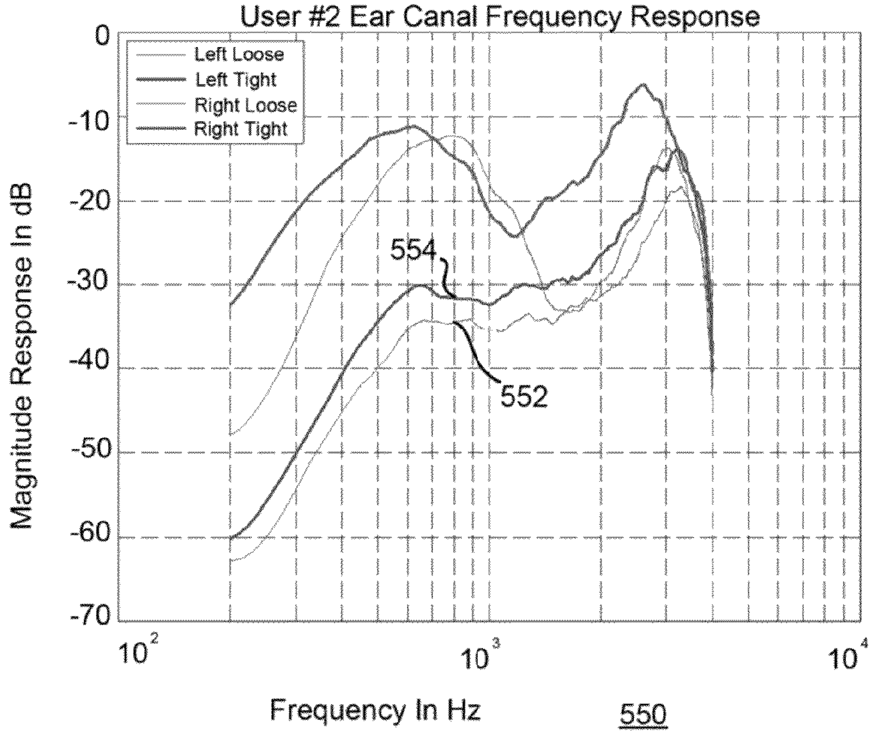

Viewing the frequency domain, FIGS. 5(*a*)-5(*b*) show graphs 500 and 550 of frequency responses 502 and 504 of the receiver-to-ear channel between the receiver and the microphone, associated with both loose and tight acoustic couplings, for two different users, respectively. Note that there is a frequency boost (e.g. low end frequency boost) in the tight acoustic coupling (i.e. frequency responses 504 and 554) for both users. Such low end frequency boost results in boomy and muddy speech, and degradation in speech quality. It is also apparent from comparing graphs 500 and 550 that the ear canal frequency response varies from user to user.

Since the ear canal frequency response varies from user to user, an average frequency response for of a plurality of different users was obtained. Accordingly, FIG. 6(*a*) is a graph 600 of averaged frequency responses 552 and 554 of the receiver-to-ear channel between the receiver and the microphone, associated with both loose and tight acoustic couplings, respectively, for a plurality of different users. In this example, the average frequency responses 552 and 554 were obtained based on thirty (30) different users. Note that there is a frequency boost (e.g. low end frequency boost) in the tight acoustic coupling. Again, such low end frequency boost results in boomy and muddy speech and degradation in speech quality. Note further that there is a high end frequency boost, but not to the extent as the low end.

Figure 6A:
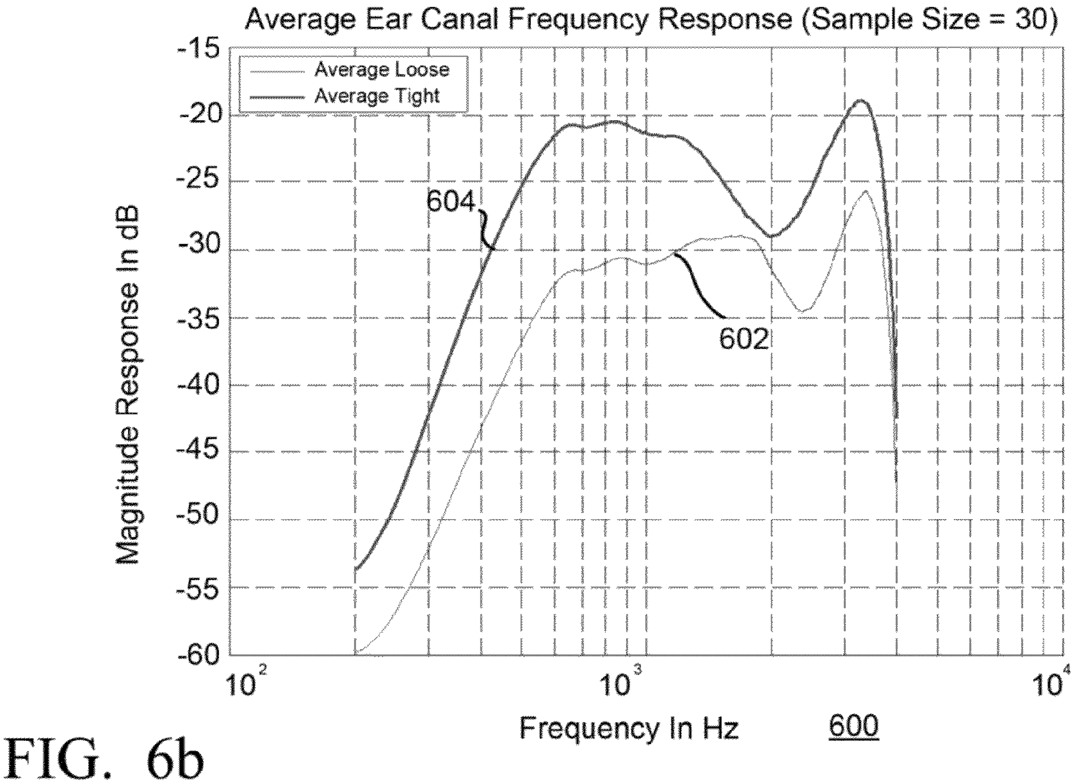
FIG. 6(*a*) is a graph of averaged frequency responses of the receiver-to-ear channel between the receiver and the ALC microphone associated with both tight and loose acoustic couplings, for a plurality of different humans.
Figure 6B:
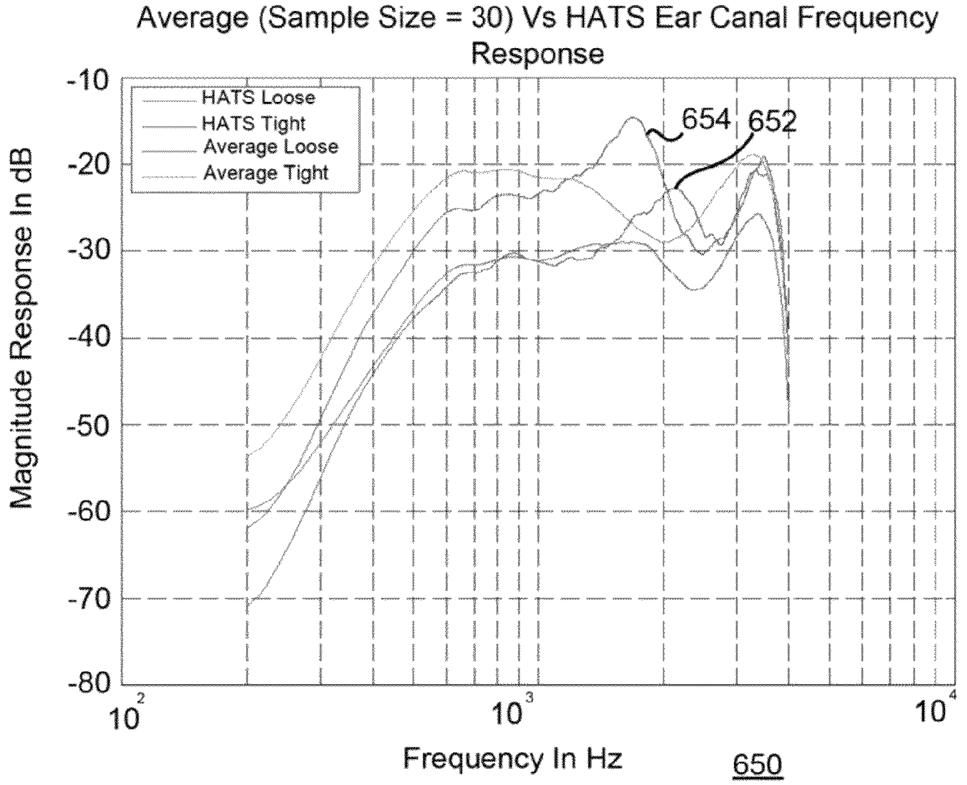

Further illustrating, FIG. 6(*b*) is a graph 650 of frequency responses 652 and 654 of the receiver-to-ear channel between the receiver and the microphone, associated with both tight and loose acoustic couplings, using a head and torso simulator (HATS). Again, there is a frequency boost (e.g. low end frequency boost) for the tight acoustic coupling, but there is relatively little or no high end frequency boost for the tight acoustic coupling. It is believed that the differences between the results in graph 650 (averaged frequency responses) as compared to the results in graph 600 of FIG. 6(*a*) (HATS frequency responses) are due to the relatively small sample size (30 users) taken for the averaging. With a sufficiently large sample size, it is believed that the averaged frequency responses would tend toward that of the HATS frequency responses.

According to the present disclosure, the quality and intelligibility of downlink audio for the mobile device is improved with use of an acoustic leak compensation (ALC) technique and system which ensures adequate equalization of the frequency response.

Figure 7:
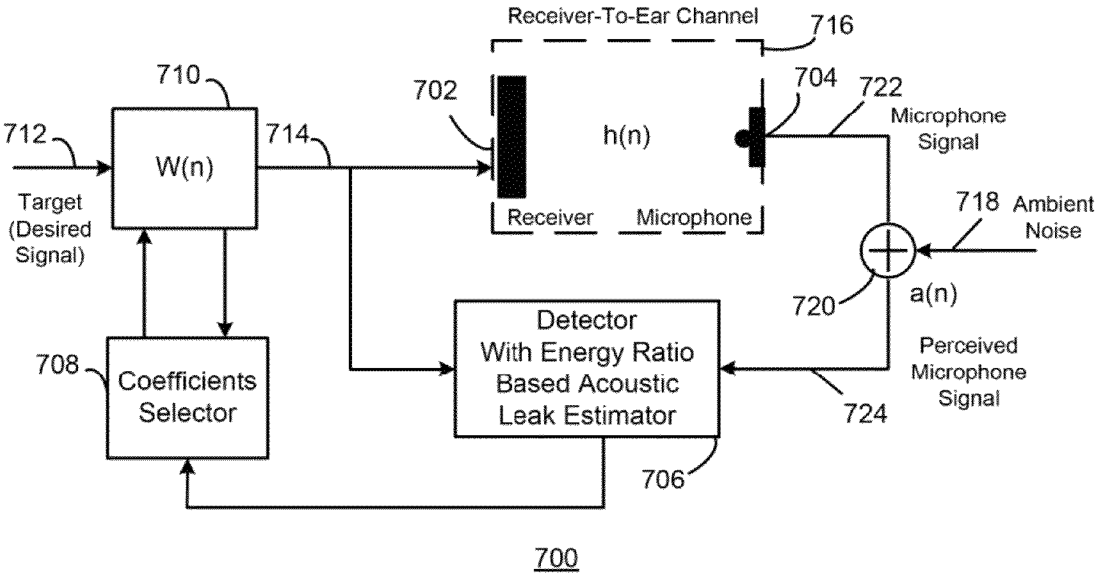
FIG. 7 is a schematic block diagram of a fixed ALC system of the present disclosure.

FIG. 7 is a schematic block diagram of an ALC system 700 of the present disclosure. ALC system 700 of FIG. 7 is a fixed ALC system which includes a receiver 702, an ALC microphone 704, a filter 710, a filter coefficients selector 708, and a detector 706. (In schematics such as FIGS. 7-9, various components may be represented as discrete components for clarity, but may be physically implemented with or without discrete components. For example, various computing or estimating or selecting functions may be carried out by a processor such as microprocessor 238.) ALC system 700 receives a baseband signal 712, filters baseband signal 712 with filter 710, and outputs filtered baseband signal 714 at receiver 702. As microphone 704 is acoustically coupled to receiver 702, a microphone signal 722 is produced from microphone 704. Microphone 704 will pick up not only audio signals from receiver 702, but ambient noise signals 718 as well. These ambient noise signals 718 are added 720 to the microphone signal 722 to produce the perceived microphone signal 724.

Detector 706 detects a change in a signal power of microphone signal 724 received at microphone 704. Note that a detected change in the signal power is based on a change in an acoustic seal coupling between receiver 702 and microphone 704. For example, the acoustic seal coupling between the ear and receiver 702 may change from a loose coupling to a tight coupling, or from a tight coupling to a loose coupling.

The detection of the change in acoustic seal coupling between receiver 702 and microphone 704 may be done in any suitable manner. In some embodiments, detector 706 may be configured to estimate a first signal power of filtered baseband signal 714 from the output of filter 710, and estimate a second signal power of microphone signal 724 from the output of microphone 704. Then, detector 706 may produce a signal power ratio of the first and the second signal powers. A change in signal power is then detected by detector 706 when the detector detects that this ratio is outside a signal power threshold. Colloquially speaking, a change in signal power outside a signal power threshold generally represents a change in signal power that has significance.

Detector 706 is configured to enable or active filter coefficients selector 708 in response to detecting the change. Here, as a "fixed" approach is utilized, filter coefficients selector 708 has access to at least two sets of filter coefficients (e.g. stored in memory) for applying to filter 710 as appropriate. A first set of filter coefficients are for use in applying to filter 710 in response to detection of a relatively "loose" coupling, and a second set of filter coefficients are for use in applying to filter 710 in response to detection of a relatively "tight" coupling. For the tight coupling, a high pass filter is achieved with the second set of coefficients, compensating for the low end frequency boost. Note that the sets of filter coefficients may be determined and set in advance (i.e. during the manufacturing or design phase, prior to and not during device operation), and may be based on experimental data and analysis.

Figure 8:
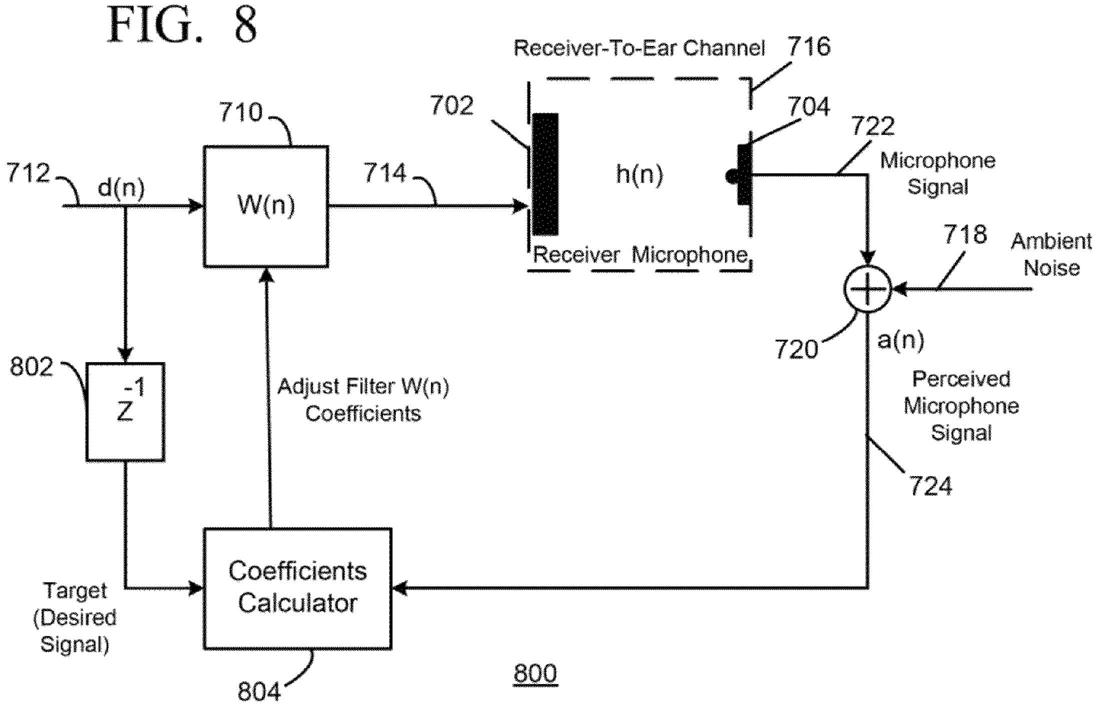
FIG. 8 is a schematic block diagram of an adaptive ALC system of the present disclosure.

FIG. 8 is a schematic block diagram of another ALC system 800 of the present disclosure. ALC system 800 is an adaptive ALC system which includes many of the same components of system 700 of FIG. 7. ALC system 800 is configured to adaptively adjust and calculate suitable filter coefficients depending on signal conditions. To achieve this, ALC system 800 has a filter coefficients calculator 804 and an inverse filter 802. Microphone signal 724 is input to filter coefficients calculator 804, and baseband signal 712 is coupled to an input of inverse filter 802 which has an output to filter coefficients calculator 804. Again, filter coefficients calculator 804 is configured to adaptively adjust and calculate suitable filter coefficients in response to these signals.

Figure 9:
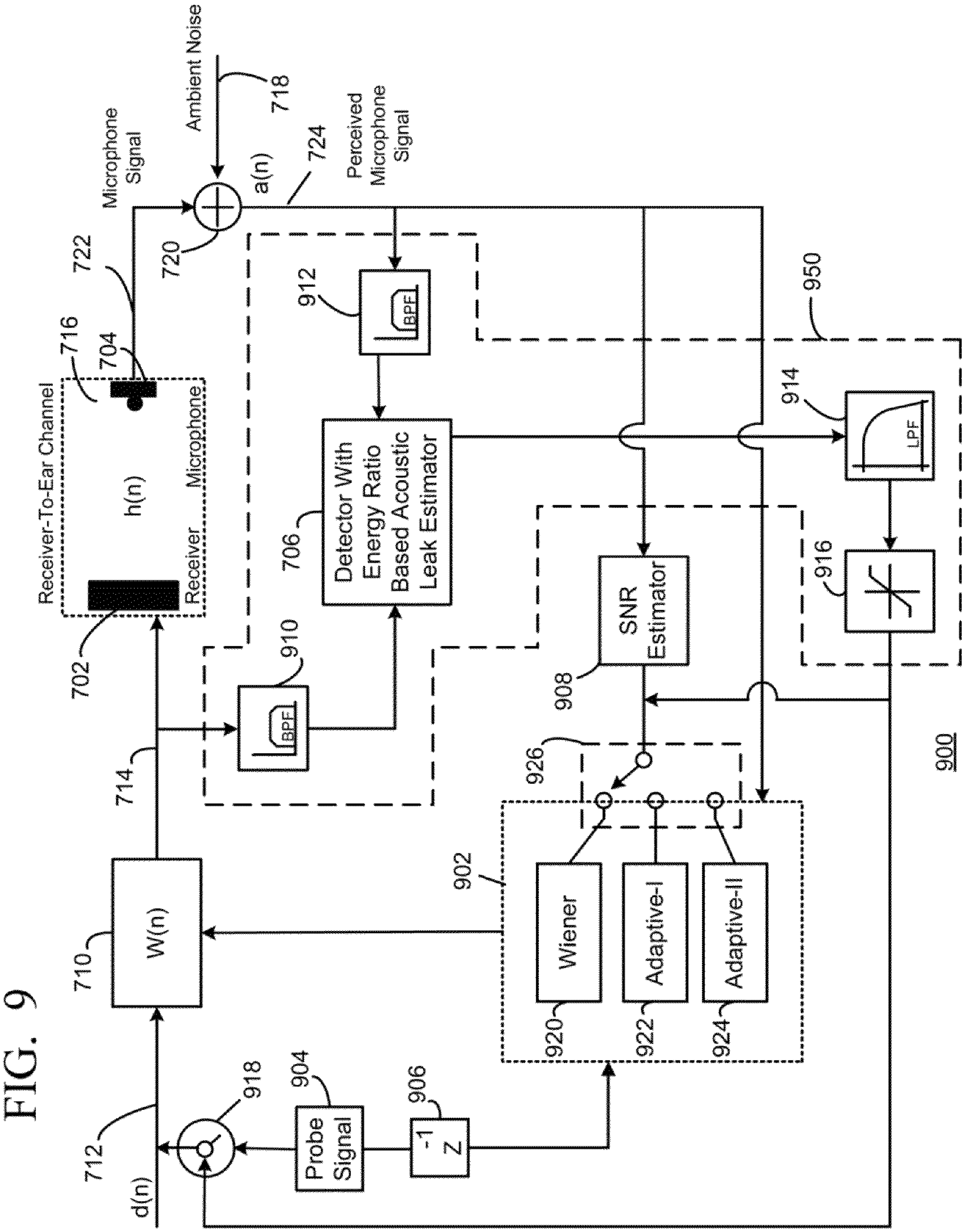
FIG. 9 is a schematic block diagram of an alternative adaptive ALC system of the present disclosure.

FIG. 9 is a schematic block diagram of yet another ALC system 900 of the present disclosure. ALC system 900 of FIG. 9 is an adaptive ALC system which includes receiver 702, microphone 704, filter 710, a detector 950, a probe signal generator 904, and a switch 918. ALC system 900 may also include a signal-to-noise (SNR) estimator 908, a filter coefficients calculator 902, and a filter type selector ("selector") 926. Although ALC system 900 of FIG. 9 will be described briefly now, such system will be described in more detail below in combination with the flowchart of FIG. 10.

Detector 950 includes detector 706, bandpass filters 910 and 912, a low pass filter 914, and a threshold detector 916. Detector 950 may be the same as or similar to detector 706 of FIG. 5, being configured to detect a change in signal power of the microphone signal 724. In response to such change, detector 950 engages switch 918 to enable or inject a probe signal from probe generator 904 to the input of filter 710. The probe signal may be a PN sequence or, in some embodiments the maximal length (ML) PN sequence. Use of a probe signal is described in more detail later below in relation to the flowchart of FIG. 10.

When the change occurs, SNR estimator 908 estimates the SNR of microphone signal 724, and selects one of a plurality of filter types of filter coefficients calculator 902 based on the estimated SNR. With use of inverse filter 906 and microphone signal 724, filter coefficients calculator 902 calculates ("on-the-fly") suitable filter coefficients for the selected filter type and applies them to filter 710. Note that inverse filter 906 provides the estimated frequency response, providing a delayed signal as the baseband signal 716 to be input to filter coefficients calculator 902. In some embodiments, when the baseband signal is delayed in this manner as the input to calculator 902, a least mean square (LMS) or normalized-LMS (NLMS) algorithm may be utilized. In other embodiments, when a filtered version of the baseband signal is utilized as the input to calculator 902, a more stable filtered X-LMS algorithm may be utilized for this purpose.

Figure 10:
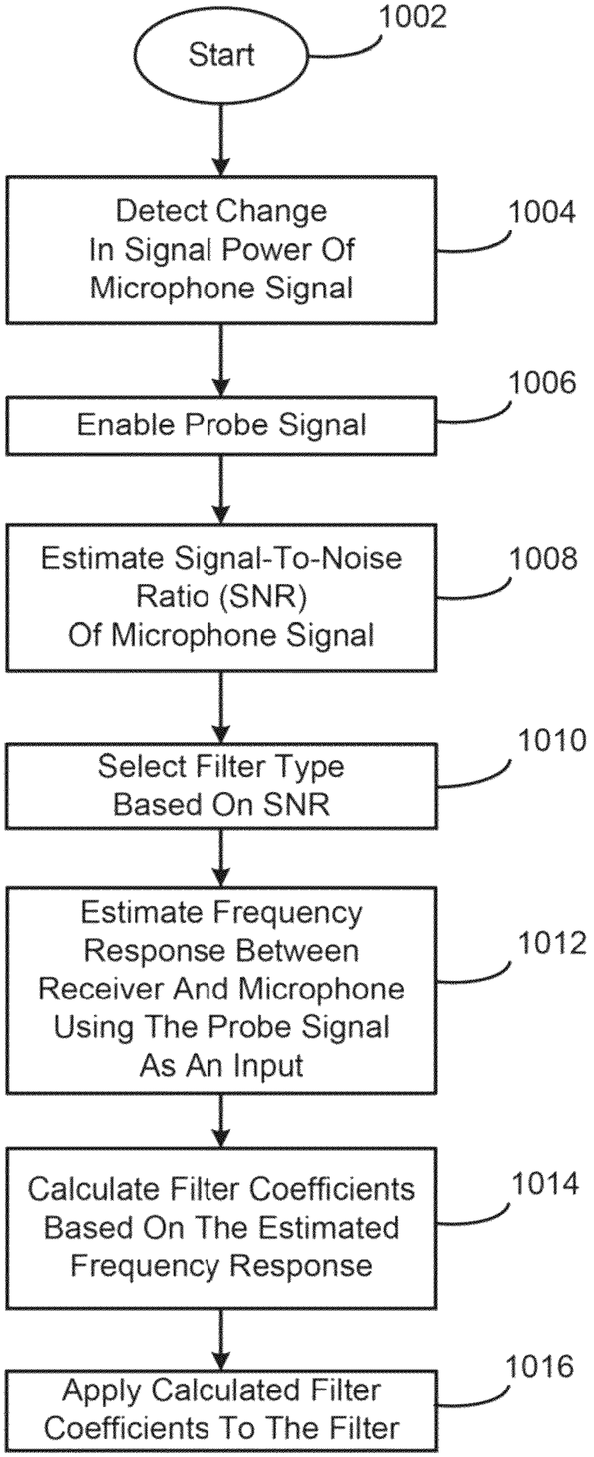
FIG. 10 is a flowchart of a method for use in improving audio quality in a mobile communication device with use of an acoustic leak compensation (ALC) system.

FIG. 10 is a flowchart of a method for use in improving audio quality in a mobile communication device with use of an acoustic leak compensation (ALC) system. Again in general, the mobile device includes a receiver and a microphone which is acoustically coupled to the receiver. The mobile device utilizes the receiver and the "ALC" microphone for improving audio quality. This ALC system may be an adaptive ALC system, such as those described herein. For example, the ALC system 900 of FIG. 9 may be utilized, and will be referred to in combination with the method of FIG. 10.

In the method, the mobile device is operating in a voice telephone call via a wireless network, where audio signals are produced at the receiver (speaker) 702. ALC system 900 receives baseband signal 712, filters baseband signal 712 with filter 710, and outputs filtered baseband signal 714 at receiver 702. As microphone 704 is acoustically coupled to receiver 702, microphone signal 722 is produced from microphone 704 (i.e. an ALC microphone). Microphone 704 will pick up not only audio signals from receiver 702, but ambient noise signals 718 as well. These ambient noise signals 718 are added 720 to the microphone signal 722 to produce the perceived microphone signal 724.

At a start block 1002 of FIG. 10, ALC system 900 detects a change in a signal power of the signals received at microphone 704 (step 1004 of FIG. 10). Note that a detected change in the signal power is based on a change in an acoustic seal coupling between receiver 702 and microphone 716. For example, the acoustic seal coupling between the ear and receiver 702 may change from a loose coupling to a tight coupling, or from a tight coupling to a loose coupling.

The detection of the change in acoustic seal coupling between receiver 702 and microphone 716 may be done in any suitable fashion. For example, filtered baseband signal 714 from the output of filter 710 may be further filtered with use of bandpass filter 910, and a first signal power of this signal may be estimated. Microphone signal 724 from the output of microphone 704 may also filtered with use of bandpass filter 912, where a second signal power of this signal is estimated. Bandpass filters 910 and 912 are configured to reduce or eliminate high end frequencies in order to prevent bias in the results due to high frequency noise. A signal power ratio of the first and the second signal powers is then produced. A change in the signal power of the microphone signal 724 is detected when the ratio is detected to be outside a signal power threshold.

If little or no change in signal power is detected in step 1004, then ALC system 900 refrains from performing the further steps recited in FIG. 10. Otherwise, if ALC system 900 does detect a change in signal power at step 1004, then ALC system 900 enables a probe signal in response (step 1006 of FIG. 10). The probe signal may be a pseudorandom noise (PN) sequence or signal. In some embodiments, the probe signal may be a maximal length (ML) PN sequence or signal.

Regarding the use of a PN signal, note that the downlink signal generally consists of far-end speech which has a characteristic of having most of its energy concentrated in certain frequency bands, depending on the nature of the words being spoken by the far end user. Thus, despite use of a broadband signal, speech is rarely composed of its entire frequency spectrum (e.g. 200-3500 Hz for narrowband) at any given time instant. Thus, a probe signal is useful, especially due to its broadband nature and relative robustness to non-white ambient noise.

Also note that a probe signal has a high probability of going unnoticed by the user due to binaural masking (e.g. from high ambient noise) along with frequency- and time-domain auditory masking effects (e.g. from downlink speech). Binaural masking relates to a phenomenon that occurs when the signal of interest is present only in one ear and noise is present only in the other ear. The presence of noise only in the other ear masks the detection of the ear in which it is present.

At this time, ALC system 900 may estimate a signal-to-noise (SNR) ratio of signals received at microphone 704 with use of SNR estimator 908 (step 1008 of FIG. 10). Based on the estimated SNR, ALC system 900 may select one of a plurality of filter types 920, 922, and 924 for filter 710 which is configured to filter the baseband signal 712 (step 1010 of FIG. 10). This may be done with use of selector 926 which selects one of filter types 920, 922, and 924.

Each filter type 920, 922, and 924 may correspond to a particular range of SNR values. In some embodiments, for example, there may be three (3) or more filter types 920, 922, and 924, where each filter type corresponds to a particular SNR range.

As an illustrative example, filter types 920, 922, and 924 may be as follows: (1) for low range SNR, filter type 920 of FIG. 9 has low processing power, low power consumption, and low performance; (2) for medium range SNR, filter type 922 of FIG. 9 has medium processing power, medium power consumption, and medium performance; and (3) for high range SNR, filter type 924 of FIG. 9 has high processing power, high power consumption, and high performance. One of these filter types may be a Wiener filter type (e.g. filter type 920).

Using the probe signal as an input, ALC system 900 estimates a frequency response of the receiver-to-ear channel 716 between the receiver and the microphone (step 1012 of FIG. 10). Based on the estimated frequency response, filter coefficients calculator 902 calculates filter coefficients for the selected filter type (i.e. the selected one of filter types 920, 922, and 924) (step 1014 of FIG. 10). Note that filter coefficients calculator 902 is configured to adaptively calculate suitable filter coefficients. The appropriate calculated filter coefficients are then applied to filter 710 (step 1016 of FIG. 10). These filter coefficients are maintained until the next change in signal power of the microphone (i.e. change in the acoustic seal coupling).

In steps 1012, 1014, and 106, the baseband signal 712 may be filtered in accordance with the estimated frequency response, where the filter weights are calculated by minimizing a difference between microphone signal 724 and the baseband signal that is filtered in accordance with the estimated frequency response. (Minimizing the difference includes strictly minimizing the difference as well as reducing the difference to where it is substantially the minimum.) Inverse filter 906 is the estimated frequency response, producing a delayed signal as the baseband signal 716 to be input to filter coefficients calculator 902. In some embodiments, when the baseband signal is delayed in this manner as the input to calculator 902, a least mean square (LMS) or normalized-LMS (NLMS) algorithm may be utilized. In other embodiments, when a filtered version of the baseband signal is utilized as the input to calculator 902, a more stable filtered X-LMS algorithm may be utilized.

The selected filtering in steps 1010-1016 may employ an adaptive mode of processing or a batch mode of processing. In the adaptive mode, the filter is updated with coefficients at each sample instant during the probe signal sequence. In the batch mode, the filter is updated with coefficients only at the end of the probe signal sequence. The adaptive mode may be more suitable and selected upon detection of a higher SNR environment, whereas the batch mode (e.g. Wiener filter) may be more suitable (e.g. more efficient) and selected upon detection of a lower SNR environment.

In some embodiments, the actions or steps 1006, 1008, 1010, 1012, 1014, and 1016 are performed only upon detecting voice inactivity in the baseband signal, after the change in the signal power is detected in step 1004. This way, the probe signal is "buried" within the speech of the user to reduce its effect on quality and intelligibility of downlink speech and the possibility of user annoyance.

Thus, techniques for use in improving audio quality using an acoustic leak compensation (ALC) system in a mobile device have been described. The mobile device includes a receiver and a microphone which is acoustically coupled to the receiver. A change in a signal power of signals received at the microphone is detected. This change is based on a change in an acoustic seal coupling between the receiver and the microphone. In response to the detecting, a probe signal is enabled, and a frequency response between the receiver and the microphone is estimated using the probe signal as an Input. Filter coefficients of a filter are calculated based on the estimated frequency response, and the calculated filter coefficients are applied to the filter. The filter type may be selected from a plurality of filter types based on an estimated signal-to-noise ratio (SNR) of the microphone signal.

Correspondingly, a mobile device of the present disclosure may include a receiver, a microphone which is acoustically coupled to the receiver, a filter, a probe signal generator, a detector, a frequency response estimator, and a filter coefficients calculator. The filter has an input which receives a baseband signal, and an output coupled to an input to the receiver. The detector is configured to detect a change in a signal power of signals received at the microphone. This change is based on a change in an acoustic seal coupling between the receiver and the microphone. A switch is utilized to enable, in response to the detector, a probe signal from the probe signal generator for outputting to the filter. The frequency response estimator is configured to estimate a frequency response between the receiver and the microphone using the probe signal as an input, and the filter coefficients calculator is configured to calculate filter coefficients of the filter based on the estimated frequency response and to apply the calculated filter coefficients to the filter.

This system may further include a signal-to-noise ratio (SNR) estimator having an input coupled to an output from the microphone, where the SNR estimator is configured to estimate an SNR of the microphone signal and a switch or selector configured to select one of a plurality of filters responsive to the SNR estimator. The detector may include a first signal power estimator configured to detect a first signal power of a filtered baseband signal from the output of the filter a second signal power estimator configured to detect a second signal power of a microphone signal from the output of the microphone; a signal power ratio generator configured to produce a signal power ratio of the first and the second signal powers; and a threshold detector configured to signal the switching circuitry responsive to the signal power ratio generator, when the ratio is detected to be outside a threshold. Finally, a voice inactivity detector which is configured to detect voice inactivity in the baseband signal may be utilized. Here, the switch is further configured to enable the probe signal from the probe signal generator for outputting to the filter in response to both the detector and the voice inactivity detector.

Implementation of one or more embodiments or variations may realize one or more benefits, some of which have been indicated already. Various techniques and apparatus can be adapted to a variety of mobile devices. Further, some techniques may be adapted to some mobile devices without any gross changes to the structure of the device, and may offer good or improved sound quality without changes to hardware. Further, as the developed with the assistance of experimentation and modeling, various embodiments can operate quickly, efficiently and reliably.

The above-described embodiments of the present disclosure are intended to be examples only. Those of skill in the art may effect alterations, modifications and variations to the particular embodiments without departing from the scope of the disclosure. The invention described herein in the recited claims intends to cover and embrace all suitable changes in technology.

What is claimed is:

1. A method for a mobile device for use in improving audio quality, the method comprising:

detecting a change in a signal power of signals received at a microphone which is acoustically coupled to a receiver;

in response to the detecting:

enabling a probe signal;

estimating a frequency response between the receiver and the microphone using the probe signal as an input;

calculating filter coefficients of a filter based on the estimated frequency response; and applying the calculated filter coefficients to the filter.

2. The method of claim 1, wherein the change in the signal power is based on a change in an acoustic seal coupling between the receiver and the microphone.

3. The method of claim 1, further comprising:

receiving a baseband signal, filtering the baseband signal with the filter, and outputting the filtered baseband signal at the receiver;

producing a microphone signal from the microphone;

producing a ratio of signal powers of the filtered baseband and microphone signals; and wherein detecting the change in the signal power further comprises detecting when the ratio is outside a threshold.

4. The method of claim 1, wherein the acts of enabling, estimating, and calculating are performed upon detecting voice inactivity in the baseband signal after detecting the change in the signal power.

5. The method of claim 1, further comprising:

estimating a signal-to-noise ratio (SNR) of the microphone signal; and selecting a filter type from a plurality of filter types based on the estimated SNR.

6. The method of claim 1, further comprising:

filtering the baseband signal in accordance with the estimated frequency response; and calculating the filter weights by minimizing a difference between the microphone signal and the baseband signal that is filtered in accordance with the estimated frequency response.

7. The method of claim 1, wherein the filter comprises at least part of an acoustic leak compensation (ALC) filter.

8. The method of claim 1, wherein the probe signal comprises a maximal length (ML) sequence.

9. The method of claim 1, wherein the filter comprises a Wiener filter.

10. A mobile communication device, comprising:

a receiver;

a microphone which is acoustically coupled to the receiver;

a filter, including:

an input which receives a baseband signal;

an output coupled to an input to the receiver;

a probe signal generator;

a detector configured to detect a change in a signal power of signals received at the microphone;

a switch configured to enable, in response to the detector, a probe signal from the probe signal generator for outputting to the filter;

a frequency response estimator configured to estimate a frequency response between the receiver and the microphone using the probe signal as an input; and a filter coefficients calculator configured to calculate filter coefficients of the filter based on the estimated frequency response and to apply the calculated filter coefficients to the filter.

11. The mobile communication device of claim 10, wherein the change in the signal power is based on a change in an acoustic seal coupling between the receiver and the microphone.

12. The mobile communication device of claim 10, wherein the detector circuitry further comprises:

a first signal power estimator configured to detect a first signal power of a filtered baseband signal from the output of the filter;

a second signal power estimator configured to detect a second signal power of a microphone signal from the output of the microphone;

a signal power ratio generator configured to produce a signal power ratio of the first and the second signal powers; and a threshold detector configured to signal the switching circuitry responsive to the signal power ratio generator, when the ratio is detected to be outside a threshold.

13. The mobile communication device of claim 10, further comprising:

a voice inactivity detector configured to detect voice inactivity in the baseband signal; and wherein the switch is further configured to enable the probe signal from the probe signal generator for outputting to the filter in response to both the detector and the voice inactivity detector.

14. The mobile communication device of claim 10, further comprising:

a signal-to-noise ratio (SNR) estimator having an input coupled to an output from the microphone, the SNR estimator being configured to estimate an SNR of the microphone signal; and a selector configured to select one of a plurality of filter types responsive to the SNR estimator.

15. The mobile communication device of claim 10, wherein the filter coefficients calculator is further configured to calculate the filter weights by minimizing a difference between the microphone signal and the baseband signal which is filtered in accordance with the estimated frequency response.

16. The mobile communication device of claim 10, wherein the filter comprises an acoustic leak compensation (ALC) filter.

17. The mobile communication device of claim 10, wherein the probe signal generator comprises a maximal length (ML) sequence signal generator.

18. The mobile communication device of claim 10, wherein the filter comprises a Wiener filter.

* * * * *